United States Patent
Roos et al.

(10) Patent No.: US 6,686,056 B2
(45) Date of Patent: Feb. 3, 2004

(54) REACTIVE OIL/COPPER PRESERVATIVE SYSTEMS FOR WOOD PRODUCTS

(75) Inventors: Kenneth D. Roos, Nicollet, MN (US); Kevin J. Archer, Charlotte, NC (US)

(73) Assignees: Chemical Specialties, Inc., Charlotte, NC (US); Archer Daniels Midland Company, Decatur, IL (US)

( * ) Notice: Subject to any disclaimer, the term of this patent is extended or adjusted under 35 U.S.C. 154(b) by 0 days.

(21) Appl. No.: 10/251,615

(22) Filed: Sep. 20, 2002

(65) Prior Publication Data

US 2003/0108759 A1 Jun. 12, 2003

Related U.S. Application Data

(63) Continuation of application No. 10/163,265, filed on Jun. 5, 2002, now abandoned.
(60) Provisional application No. 60/336,577, filed on Dec. 4, 2001.

(51) Int. Cl.$^7$ ................................................ B32B 21/06
(52) U.S. Cl. .................... 428/535; 428/536; 428/537.1; 524/13; 524/14; 524/16
(58) Field of Search ............................. 428/537.1, 535; 428/536; 524/13, 14, 16

(56) References Cited

U.S. PATENT DOCUMENTS

| | | | | |
|---|---|---|---|---|
| 3,837,875 | A | * | 9/1974 | Murphy |
| 4,001,400 | A | * | 1/1977 | Hager |
| 4,360,385 | A | | 11/1982 | Grunewalder |
| 4,404,239 | A | | 9/1983 | Grunewalder |
| 5,607,633 | A | | 3/1997 | Sleeter et al. |
| 5,719,301 | A | | 2/1998 | Sleeter |
| 6,277,310 | B1 | | 8/2001 | Sleeter |
| 6,569,540 | B1 | * | 5/2003 | Preston et al. |

FOREIGN PATENT DOCUMENTS

| | | |
|---|---|---|
| JP | 8183010 | 7/1996 |
| SE | 8105527-9 | 11/1984 |
| WO | WO 92/19429 | 11/1992 |

OTHER PUBLICATIONS

Sandberg, Dick; *Weathering of Radial and Tangential Wood Surfaces of Pine and Spruce.* Holzforschung, vol. 53, No. 4, 1999, pp. 355–364.

Delphion view of Union of Soviet Socialist Republics (USSR) Application No. SU1976002374218, Jun. 21, 1976.

Fojutowski, A,; Lewandowski, O, *Zesz. Probl. Postepow Nauk Roln.* No. 209: 197–204 (1978) (no English translation available).

Feist, William C.; Mraz, Edward A., Forest Products Lab Madison WI, *Wood Finishing: Water Repellents and Water-Repellent Preservatives.* Revision Report No.–FSRN–FPL–0124–Rev (NTIS 1978).

Pizzi, A., *A New Approach To Non–Toxic, Wide–Spectrum, Groun–Contact Wood preservatives. Part I. Approach And Reaction Mechanisms*, Holzforschung vol. 47, No. 3, 1993, pp. 253–260.

* cited by examiner

*Primary Examiner*—Leszek Kiliman
(74) *Attorney, Agent, or Firm*—McAndrews, Held & Malloy, Ltd.

(57) ABSTRACT

The specification describes preserved solid wood or wood composites including a copper ammonium acetate complex wood preservative and a drying oil. The wood preservative is present in the wood in an amount effective to improve the resistance of the treated wood to at least one type of decomposition, such as decay or insect attack. The drying oil is present in the wood in an effective amount to accomplish at least one useful end, such as reducing the water absorption or thickness swell of the treated wood or increasing its mechanical strength, even in a wood composite made using less binding resin than usual. Yet another aspect of the invention is a method of making the treated wood from green wood in solid or flaked form. A copper ammonium acetate complex wood preservative and optionally a drying oil are added to the green wood.

19 Claims, No Drawings

REACTIVE OIL/COPPER PRESERVATIVE SYSTEMS FOR WOOD PRODUCTS

This application is a continuation of U.S. Ser. No. 10/163,265, filed Jun. 5, 2002, now abandoned, which claims priority to U.S. Serial No. 60/336,577, filed Dec. 4, 2001, now pending. The entire specification and all the claims of the applications referred to above are hereby incorporated by reference to provide continuity of disclosure.

STATEMENT REGARDING FEDERALLY SPONSORED RESEARCH OR DEVELOPMENT

Not applicable.

BACKGROUND

This invention relates to the incorporation of a drying oil and a copper containing preservative system into wood products, which may include lumber and plywood, and into wood and agricultural based composite products. Wood based composite products can include products such as oriented strandboard, medium density fiberboard, fiberboard, hardboard, and particle board. The invention also relates to the method of manufacturing wood based composite products whereby a drying oil and a wood preservative composition are added to the wood furnish (defined as wood strands, chips, particles, flakes and fiber), plywood (whether in the form of separate plies or a bound sheet), or solid wood prior to or after drying. Where a wood furnish or separate wood plies are treated, the wood is then formed and pressed into a finished board or panel product.

The production of wood based composite panel products has increased dramatically in recent years. Oriented strandboard (OSB) production exceeded that of plywood in the Year 2000. In order to continue this new growth, additional uses for OSB need to be developed. Common applications for these products include roof sheathing, wall sheathing, flooring, structural insulated panels and engineered wood components such as I-joists. With the ever-expanding production capacity of wood based composites there is a critical need to find additional uses.

The use of medium density fiberboard and hardboard panel products likewise has increased dramatically over the last couple decades. However, these products are typically used in interior applications where attack from insects or decay fungi is limited and dimensional stability is not of great concern. The market for these types of materials is fairly well developed. To maintain market share and increase production it will be necessary to develop new products that can withstand exterior environments.

The expansion of wood fiber, particle and flake based composites into certain construction applications is hindered by limitations in the physical and mechanical properties of the manufactured panels, in particular excessive water absorption and propensity to swell, but also by their susceptibility to attack by biological agents such as decay fungi and termites.

Chemical preservatives and water repellent treatments are available for solid lumber and plywood. Such chemical treatments are applied to lumber, millwork, wood plies, and so forth using vacuum pressure processes to ensure uniform distribution of the active ingredients throughout the wood components. Treated woods find application in the construction of residential housing and commercial buildings.

Historically, attempts to incorporate chemical treatments into wood based composites using similar technology have failed for economic reasons or more commonly because of technical problems associated with irreversible and excessive swelling of the treated panels and severe loss of structural integrity.

The development of an economically viable preservative/water repellent treatment for solid wood, plywood, and wood based composites with minimal or no impact on board structural properties, would be desirable to the industry and consumers.

The development of such products would have a significant impact upon the forest resources of North America as well as the world. Solid wood or a formed panel product that has been treated to resist biological action and is inherently stable to resist water will significantly increase the service life of the final wood product. Hence replacement of damaged, decayed, or destroyed panels will be less frequent. Therefore, more solid wood and wood fiber can be channeled to new construction and not the replacement market. This will limit the stress on the forest resources of North America, which have been shrinking over the last two decades due to land being tied up in "natural" status, which cannot be harvested.

U.S. Ser. No. 09/550,027, filed Apr. 14, 2000, now U.S. Pat. No. 6,565,540, entitled: Dimensionally Stable Wood Composites And Methods For Making Them, discloses treated wood composites and their ingredients and manufacture. The latter application is incorporated by reference in its entirety.

PCT patent application WO 92/19429, published Nov. 12, 1992, in Example 2, describes a method of treating an article of prepared wood by immersing it for 20 minutes in a bath of 180° C. linseed oil containing a drier (siccative) of 0.07% lead, 0.003% manganese and 0.004% calcium and 0.3% copper naphthenates and 0.03 zinc naphthenates as an insecticide and fungicide.

U.S. Pat. Nos. 5,607,633, 5,719,301, and 6,277,310 describe bonding composite panels such as oriented strand board, particle board, plywood, MDF, hardboard, and similar panels, using a material such as linseed oil, which may be modified to provide bonding characteristics.

Fojutowski, A.; Lewandowski, O, *Zesz. Probl. Postepow Nauk Roln.* No. 209: 197–204 (1978), describes fungicides comprising fatty acids with copper compounds, applied by dipping hardboard heated to 120° C. into a bath of the fungicide, also maintained at 120° C.

Japanese Patent Application 08-183,010 JP, published in 1996, describes a modified wood claimed to have mildew-proofing and antiseptic properties and ant-proofing properties, made by treating wood with a processing liquid containing a composite multivalent metal (one example of which is copper) salt and linseed oil or another liquid hardening composition. The abstract states that the composite multivalent metal salt is strongly fixed within the material so as to let the composite multivalent metal salt give antibacterial properties, antiseptic properties, ant-proofing properties, water repellency and strength to wood.

U.S. Pat. No. 3,837,875 describes as a composition for cleaning, sealing, preserving, protecting and beautifying host materials such as wood a mixture of boiled linseed oil, turpentine, pine oil, a dryer and atomized metallic copper with the copper being present in a ratio of about 28 parts per million.

Feist, William C.; Mraz, Edward A., Forest Products Lab Madison Wis., *Wood Finishing: Water Repellents and Water-Repellent Preservatives. Revision,* Report Number-FSRN-FPL-0124-Rev (NTIS 1978) discloses preservatives containing a substance that repels water (usually paraffin wax or related material), a resin or drying oil, and a solvent such as turpentine or mineral spirits. Addition of a preservative such as copper naphthenate to the water repellent is asserted to protect wood surfaces against decay and mildew organisms.

Soviet Union Patent No. SU 642166 describes a wood surface staining and preservation treatment, carried out by impregnating wood with an aqueous copper salt solution, followed by thermal treatment in boiling drying oil containing 8-hydroxyquinoline dye. The copper salt and the dye form a complex which is stated to stain and preserve the wood.

Schultze-Dewitz, G., *Improvement of Beech Wood*, HOLZFORSCHUNG UND HOLZVERWERTUNG Vol. 46, No. 2, 1994 pp. 34–39, states that specimens of beech wood in air-dried, green, and water-stored conditions (about 15, 120 and 150–180% moisture content, respectively) were impregnated with nine different chemicals/mixtures, and effects on the dimensional stability and physical-and mechanical properties of the wood. One of the impregnants was linseed oil varnish. All the impregnants were said to dimensional stability, and also were disclosed to improve certain properties of the wood.

Pizzi, A., *A New Approach To Non-Toxic, Wide-Spectrum, Ground-Contact Wood Preservatives. Part I. Approach And Reaction Mechanisms*, HOLZFORSCHUNG Vol. 47, No. 3, 1993, pp. 253–260, asserts that copper soaps, made with the carboxylic acid groups from unsaturated fatty acids of edible vegetable oils which are non-toxic (such as corn oil or sunflower oil), from resin acids of rosin which are non-toxic, and also from synthetic unsaturated polyester resins were shown in 25-year tests to have effectiveness and long-term durability as ground contact wood preservatives for use against termites and fungal attack.

SUMMARY OF THE INVENTION

One aspect of the present invention is treated wood comprising a copper based wood preservative, for example a copper ammonium acetate complex, and a drying oil. The drying oil can be, for example, a drying agricultural oil or fish oil.

The wood preservative is present in the wood in an amount effective to improve the resistance of the treated wood to at least one type of decomposition. Alternative types of decomposition contemplated here are decay, termite or other insect damage.

The drying oil is present in the wood in an effective amount to accomplish at least one useful end. One useful end is to reduce the water absorption of the treated wood. An alternative useful end is to reduce the thickness swell of the treated wood.

Another aspect of the invention is a treated wood composite comprising: a predominant proportion of wood particles; a copper based wood preservative; and a drying oil.

The wood preservative again is present in the wood composite in an amount effective to improve the resistance of the treated wood composite to at least one type of decomposition.

The presence of a copper based wood preservative with a reactive agricultural oil or fish oil has the potential to provide biological efficacy against wood biodeteriogens. (A biodeteriogen is an organism that is capable of causing biodeterioration—an undesirable change in the properties of a material caused by the vital activities of living organisms.)

Biodeteriogens for wood include decay fungi, termites and other insects. Complexation of the preservative with the reactive oil reduces the likelihood of leaching/depletion of the preservative in service.

The drying oil again is present in the wood in an effective amount to accomplish at least one useful end. For example, the drying oil may interact to enhance the dimensional stability or water repellency of the wood composite, and may function to reduce or eliminate the need for a separate binder resin.

Yet another aspect of the invention is a method of making treated wood composites. One step of the method is providing green wood in flaked form. Another step of the method is adding to the green wood a copper based wood preservative. The wood preservative again is added to the wood composite in an amount effective to improve the resistance of the treated wood composite to at least one type of decomposition. Another step of the method, alternatively carried out simultaneously with, before, or after the wood preservative treatment, is adding to the green wood a drying oil. The drying oil again is present in the wood composite in an effective amount to accomplish at least one useful end.

One advantage of the present method is that it allows the wood to be treated with the preservative while green, then dried once, instead of drying the wood, treating it with a water dispersion of the treating agent (thus rewetting the wood), then drying the wood a second time.

DETAILED DESCRIPTION

The present inventors have jointly developed a system for incorporating a copper based preservative system, for example the treatment commercially available as the COMPTEC™ copper ammonium acetate complex wood treatment, in combination with drying oils functioning as described herein, into the manufacturing process for solid wood, plywood, and wood based composites.

Pertinent copper based preservatives include, for example:

alkaline (amine or ammonia) copper quats (ACQ)
ammonium/copper complex
ammoniacal copper zinc arsenate (ACZA)
bis(N-cyclohexyldiazeniumdioxy)copper
copper acetate
copper ammonium acetate complex
copper azole
copper borate
copper carbonate
copper citrate,
copper fluoride
copper fluoroborate
copper hydroxide
copper hydroxycarbonate
copper naphthenate
copper oxide
copper oxychloride
copper salt of 8-Hydroxyquinoline
copper sulfate
diethanolamine/copper complex
diethylamine/copper complex
ethanolamine/copper complex
ethylene diamine/copper complex
triethanolamine/copper complex and combinations thereof. Many copper-based wood preservatives are known, and their use is contemplated here.

Pertinent agricultural drying oils include linseed, soybean, canola, rapeseed, sunflower, tung and castor oils and any other oils derived from agricultural sources. Pertinent fish oils, which are also drying oils, can be extracted from sardines, mackerel, codfish (including but not limited to cod-liver oil), tuna, salmon, pilchard, menhaden, and herring, as well as other species.

For composite panel products, the oil copper combination can be applied to a wet (green) or dry wood or wood furnish but is most optimally applied to green or wet wood furnish at a moisture content (MC) above the fiber saturation point (i.e. above 30% MC). The use of a green wood furnish ensures that the penetration of the preservative system into wood flakes is maximized for optimum efficacy.

In the case of solid lumber, piles, and already manufactured plywood, the copper combination is preferably applied to dry wood at a moisture content around 15–19%. The use of dry wood ensures penetration deep into the wood to maximize penetration.

The addition rate for the copper ammonium acetate complex wood treatment formulation may range from 0.5% m/m (i.e. "mass-to-mass" or weight %) active ingredient to 5% m/m active ingredient defined on a copper ammonium acetate complex basis.

The drying oil addition rate may vary from 0.5% to 50% by weight (m/m). The lower limit of drying oil addition can alternatively be 1%, 1.25%, 2%, 2.5%, 3%, 4%, or 5% by wood weight, on the same basis. The upper limit of drying oil addition can alternatively be 50%, 40%, 30%, 25%, 20%, 15%, 14%, or 13%, or 12%, or 11%, or 10%, or 8%, or 6%, or 5% by wood weight, on the same basis. The decay and termite resistance performance of the finished panels are proportionally linked to the weight percentage of copper ammonium acetate complex wood treatment incorporated into the furnish. Similarly, improvements in water absorption and thickness swell is proportionally related to the level of oil incorporated into the matrix.

The COMPTEC™ wood composite treatment and the oil are believed to be synergistic when used to treat solid wood, wood composites, or plywood. Their use in wood based composites can provide mechanical panel properties that are superior to those expected with conventional resin systems alone. The increase in mechanical properties correlates with the quantity of oil and copper ammonium acetate complex wood treatment added to the furnish or plies. Given a consistent resin loading, as the level of oil increases per given level of copper ammonium acetate complex wood treatment, the mechanical properties improve significantly. The interaction of the copper based wood treatment and oil is believed to create a secondary resin source which enhances the overall furnish to furnish (particle/flake: particle/flake) bonding in wood composites. This improves the overall mechanical properties of the finished panel.

This interaction is thought to act similarly to a chemical process known as epoxidation in which oils derived from agricultural products can be converted from liquids into either soft or hard plastic compounds. Examples of this would be bags used for blood collection and PVC plastic stabilizer for plastic piping used for plumbing. Chemically, epoxidation involves the addition of an oxygen bridge to unsaturated oil molecules via a catalytic reaction pathway. In this invention, copper ions are provided by the copper ammonium acetate complex wood treatment.

Therefore, it is hypothesized that, in the manufacture of wood based composites and plywood, especially during pressing, the active ingredients of the copper ammonium acetate complex wood treatment epoxidize the oil, creating a secondary binding agent for the wood. Using both a copper ammonium acetate complex and a drying oil, it is possible to make composite wood products using no other synthetic binding resins that are currently used by industry. These resins include phenol formaldehyde, isocyanates, and urea formaldehyde resins.

The treatment of solid wood with an oil and another copper based wood preservative is also contemplated. Copper ammonium acetate complex (COMPTEC™) and alkaline copper complex wood treatment solutions are two of many copper based formulations that are suitable for this purpose.

The treatment solutions can be emulsified using water as a carrier, the oil can be utilized as the carrier of the biocide treatment, or the oil and biocide can be applied separately, as by first treating the wood with the copper complex, then treating it with the reactive oil, which can be applied, for example, in the form of an aqueous emulsion.

The reactive oil can alternatively be formulated as part of a water repellent emulsion system that is subsequently applied to the wood, which can also include a binding resin. The copper complex, reactive oil, water repellant, and binding resin, or any subset of them can also be provided as one formulation. The inventors contemplate that if the wax emulsion and the copper complex are present in the same formulation and would otherwise tend to react prematurely, the wax emulsion will partially shield the oil from the copper in this single step emulsion. The copper and oil then will interact when the wax emulsion breaks within the wood.

The wood may be treated by pressure treatment, much like other wood treatments are applied to solid wood. One pressure treatment may be used, or a series of two or more pressure treatments may be used. More than one pressure treatment may be applied if the copper complex and reactive oil are added from separate formulations.

The copper complex and reactive oil treatments can be carried out at ambient temperature, for example 21° C., at a lower temperature, or at an elevated temperature. For example, although the treatment temperature is not contemplated to be critical, a suitable temperature range is 0° C.–179° C., alternatively 0° C.–119° C., alternatively 0° C.–100° C., alternatively 0° C.–80° C., alternatively 0° C.–60° C., alternatively 0° C.–50° C., alternatively 0° C.–40° C., alternatively a lower limit of any of the preceding ranges of 15° C.

The epoxidization process is contemplated to improve the mechanical properties of solid wood, as well as preserving it. It is hypothesized that the epoxidation process between the copper ions and reactive oil occurs, or is at least initiated, when the oil/copper treated solid wood is dried using conventional drying equipment to a moisture content appropriate for its eventual end use.

An oil/copper treated wood furnish can also be dried using conventional drying equipment to a moisture content appropriate to the type of resin system that is utilized for the specific composite product being manufactured. On the other hand, copper treated wood flakes can be first dried and then sprayed with the oil at the same time as resin and wax are applied in a conventional blender prior to forming and pressing. The moisture content of the furnish treated in this manner can range from 0.5% to 25% MC based on oven-dry weight of furnish. The dried furnish optionally may be blended with any of a vast variety of resins currently used by the composite wood industry. Such resins could include, but are not limited to liquid phenol formaldehyde (LPF), powder phenol formaldehyde (PPF), acid catalyzed PF resins (commonly known as Novolac resins), isocyanate (MDI), phenol-melamine-formaldehyde adhesives (PMF), urea formaldehyde, or combinations of those resins. Addition rates may vary from 0% to 25% resin solids depending on panel type and application.

The dry treated wood furnish is sprayed with resin and wax (and in some cases the drying oil), formed and oriented into a mat of the desired thickness and pressed to form the final panel. Mats are formed to suit the type of composite and desired end use. Formed mats are pressed under heat and pressure conditions appropriate to the final end use of the finished board. Typical press parameters include consolidation pressures ranging from 50 psi (35 N/cm$^2$) to 650 psi (453 N/cm$^2$), cook pressures from 0 psi (0 N/cm$^2$) to 400 psi (280 N/cm$^2$), and a de-gas segment. Typical press temperatures vary from 200° F. (93° C.) to 550° F. (288° C.), depending on type of composite. Press time may vary from 1 minute to 20 minutes duration.

Resin is applied to the treated plies, which are then formed with specific cross orientation of the veneers, or in the case of laminated veneer lumber all oriented in one direction. The formed billet is transferred into a press and consolidated into the final plywood or structural lumber substitute. Typical parameters include consolidation pressures ranging between 50 and 300 psi (between 35 and 198 N/cm$^2$). Typical press temperatures may vary from 200° F. (93° C.) to 550° F. (288° C.). In some cases radio frequency curing may be utilized.

The physical and structural characteristics of the oil/copper ammonium acetate complex wood treatment treated composite or plywood panels are equivalent or superior in magnitude to similarly manufactured but untreated or copper ammonium acetate treated composites and plywood that are not treated with an oil.

Examples illustrating application of the invention using oriented strandboard and medium density fiberboard as the matrix are presented below.

EXAMPLE 1

OSB

Five sets of three wood composite panels measuring 21 inches×21 inches×12 inch (53 cm×53 cm×1.2 cm) were manufactured on a laboratory press. One set of panels contained no oil or preservative and served as reference control panels. Another set of panels used copper ammonium acetate (copper ammonium acetate complex wood preservative) treated flakes without linseed oil and was designed to serve as a reference control. The remaining panels used copper ammonium acetate treated flakes with varying loadings of linseed oil, Archer Daniels Midland's GP-1125. These levels were 1.25%, 2.5%, and 5.0% m/m based on oven dry wood weight.

Green flakes (50% mc—"moisture content") were treated with copper ammonium acetate alone or in combination with the various levels of oil in a rotary batch type blender equipped with a Coil Spinning disc atomizer. The flakes were treated with concentrated copper ammonium acetate solution (31.32% nominal active ingredient level) such that the final chemical loading on the flakes was equivalent to 3.1% m/m on an oven dry weight of flakes basis. The treated flakes received a short dwell time (30–60 seconds) before drying. The target moisture content after drying was 5%.

One set of flakes was sprayed with liquid phenolic resin at an addition rate of 3.5% solids on an oven dry weight of flakes basis, and a second batch was blended with powdered phenolic resin at an addition rate of 2.5% solids based on oven dry weight of flakes. A wax emulsion at a 1.0% solids addition rate was added to all combinations.

All the panels were pressed using mill pressing parameters appropriate for each resin type. The press temperature was 380° F. (193° C.). The initial pressure was 550 psi (383 N/cm$^2$). The press cycle times varied from 4.0 to 5.5 minutes plus a 30 second de-gas period. The target density for the control panels was 40 pcf (pounds per cubic foot, 0.64 g/cm$^3$), and was increased to 42 pcf (0.67 g/cm$^3$) for the copper ammonium acetate treated panels. The density was increased in the treated panels to maintain an equal wood weight in the finished panels.

After pressing the panels were hot stacked for 24 hours prior to mechanical and physical panel property testing. The panels were tested for Internal Bonding (IB), dry and wet strength (Modulus of Rupture, MOR), stiffness (modulus of elasticity, MOE), water absorption (WA), thickness swell (TS), and wet bending.

The results, Tables 1A and 1B, indicate a strong dose response between increasing the oil level and the use of copper ammonium acetate complex wood treatment at a 3.1% m/m loading. Superior water absorption, thickness swell, enhanced internal bond, and improved wet bending strength were observed.

TABLE 1A

| | Liquid PF resin: | | | | | | | | | | | |
|---|---|---|---|---|---|---|---|---|---|---|---|---|
| Treatment | IB, psi | MOE, psi | MOR, psi | WA % | TS % | Wet MOR psi | IB (kPa) | MOE (MPa) | MOR (MPa) | WA % | TS % | Wet MOR (MPa) |
| Control (no copper ammonium acetate complex wood treatment, no oil) | 56.8 | 663,797 | 3800 | 29.6 | 11.5 | 1945 | 391.6 | 4576.7 | 26.2 | 29.6 | 11.5 | 13.4 |
| 1.25% oil | 63.6 | 762,220 | 4642 | 26.8 | 8.6 | 1807 | 438.5 | 5255.3 | 32.0 | 26.8 | 8.6 | 12.5 |
| 2.50% oil | 97.2 | 753,322 | 4489 | 25.3 | 6.7 | 1987 | 670.1 | 5194.0 | 30.9 | 25.3 | 6.7 | 13.7 |
| 5.00% oil | 113.5 | 660,223 | 3877 | 17.8 | 4.2 | 2504 | 782.5 | 4552.1 | 26.7 | 17.8 | 4.2 | 17.3 |

TABLE 1B

Powder PF resin:

| Treatment | IB (psi) | MOE (psi) | MOR (psi) | WA % | TS % | Wet MOR (psi) | IB (kPa) | MOE (MPa) | MOR (MPa) | WA % | TS % | Wet MOR (MPa) |
|---|---|---|---|---|---|---|---|---|---|---|---|---|
| Control (no copper ammonium acetate complex, no oil) | 48.7 | 572,082 | 3698 | 25.9 | 11.8 | 1718 | 335.7 | 3944.4 | 25.5 | 25.9 | 11.8 | 11.8 |
| Control with copper ammonium acetate complex no oil | 52.8 | 680,108 | 3708 | 31.0 | 10.6 | 1882 | 364.0 | 4689.2 | 25.6 | 31.0 | 10.6 | 13.0 |
| 1.25% oil | 62.2 | 683,950 | 3784 | 16.3 | 5.5 | 1701 | 428.9 | 4715.7 | 26.1 | 16.3 | 5.5 | 11.7 |
| 2.50% oil | 81.1 | 855,498 | 4450 | 16.3 | 4.2 | 1765 | 559.2 | 5898.5 | 30.7 | 16.3 | 4.2 | 12.2 |
| 5.00% oil | 116.4 | 758,729 | 4655 | 15.6 | 3.7 | 2354 | 802.5 | 5231.3 | 32.1 | 15.6 | 3.7 | 16.2 |

To evaluate the decay and termite resistance of the treated panels samples cut from the lab boards were exposed at two field test sites located in Hilo, Hi. One site provides optimum conditions for wood decay fungi year round, the other provides a severe Formosan termite hazard.

For the decay testing, a procedure known as the ground proximity test was used. Samples 50×125 mm×board thickness were placed into test lying flat on top of 100 mm thick concrete blocks in direct contact with the ground. The test samples and concrete blocks were covered with a suspended horticultural shade cloth to allow rain ingress while retarding moisture loss. The amount of decay was measured using a subjective visual rating system after 12 months exposure. A decay rating of '0' indicates complete destruction of the sample whereas a rating of 100 equates to 100% sound. Data are summarized for Liquid PF and Powdered PF resin systems in Tables 2A and 2B. It is apparent that the copper only and copper+oil treatments provide significant resistance to decay relative to conventional untreated OSB samples.

For the termite testing a modified version of the set up used for the ground proximity decay test was used. Test samples (50×125 mm×board thickness) were placed flat side down on the top of open concrete blocks which were in direct contact with the ground. Untreated feeder strips were placed between the test samples and into the ground through openings in the concrete blocks to attract termites and to direct them to the test samples. The whole assembly was covered with exterior plywood supported on a treated 1"×6" frame box. Inspections were carried out periodically to monitor the performance of the preservatives in the test. A subjective numerical rating system was used to determine the percent volume of sample consumed by termite feeding activities. A termite rating of '0' indicates complete destruction of the sample whereas a rating of 100 equates to 100% sound. Results are summarized in Tables 2C and 2D. The results show that the copper only and copper+oil treatments provide significant protection from Formosan termite feeding. Untreated OSB samples and samples containing oil only were highly susceptible to termite attack.

TABLE 2A

Decay test results
Field Exposure Above Ground (Ground Proximity)
Hilo, HI - 12 months exposure
Liquid PF resin

| Treatment | Average Decay rating (Percent soundness) |
|---|---|
| Control (no copper ammonium acetate complex, no oil) | 0 |
| Control with copper ammonium acetate complex (Comptec), no oil | 78 |
| 1.25% oil + Comptec | 84 |
| 2.50% oil + Comptec | 88 |
| 5.00% oil + Comptec | 95 |
| 1.25% oil only | 0 |
| 2.5% oil only | 0 |
| 5.0% oil only | 0 |

Decay test results
Field Exposure Above Ground (Ground Proximity)
Hilo, HI - 12 months exposure
Powdered PF resin

| Treatment | Average Decay rating (Percent Soundness) |
|---|---|
| Control (no copper ammonium acetate complex, no oil) | 0 |
| Control with copper ammonium acetate complex (Comptec), no oil | 78 |
| 1.25% oil + Comptec | 89 |
| 2.50% oil + Comptec | 89 |
| 5.00% oil + Comptec | 94 |
| 1.25% oil only | 0 |
| 2.5% oil only | 0 |
| 5.0% oil only | 16 |

TABLE 2C

Termite test results
Field Exposure Above Ground (Ground Proximity)
Hilo, HI
Powdered PF resin

| Treatment | Average termite rating Exposure time (months) | |
|---|---|---|
| | 5 | 12 |
| Control (no copper ammonium acetate complex, no oil) | 0 | 0 |
| Control with copper ammonium acetate complex (Comptec), no oil | 96.3 | 91 |
| 1.25% oil + Comptec | 96.7 | 90 |
| 2.50% oil + Comptec | 96 | 92.8 |
| 5.00% oil + Comptec | 100 | 95.8 |
| 1.25% oil only | 0 | 0 |
| 2.5% oil only | 0 | 0 |
| 5.0% oil only | 40 | 0 |

TABLE 2D

Termite test results
Field Exposure Above Ground (Ground Proximity)
Hilo, HI
Liquid PF resin

| Treatment | Average termite rating Exposure time (months) | |
|---|---|---|
| | 5 | 12 |
| Control (no copper ammonium acetate complex, no oil) | 0 | 0 |
| Control with copper ammonium acetate complex (Comptec), no oil | 96.3 | 91 |
| 1.25% oil + Comptec | 100 | 94.8 |
| 2.50% oil + Comptec | 100 | 93.8 |
| 5.00% oil + Comptec | 98.8 | 76.6 |
| 1.25% oil only | 0 | 0 |
| 2.5% oil only | 0 | 0 |
| 5.0% oil only | 8 | 0 |

EXAMPLE 2

MDF:

The objective of this study was to determine if the synergistic effects observed with OSB would carry over into other composite applications.

Several sets of medium density fiberboard (MDF) panels were manufactured using a lab press and a mixture of northern hardwood fiber. These panels measured 21 inches by 21 inches by ⅜ inch thick (53 cm×53 cm×1 cm). Fiber as received was rehydrated to approximately 50% MC (moisture content) oven-dry basis to simulate the raw material supply used in conventional MDF manufacturing operations. Then the fiber was treated with 3.1% m/m of an active copper ammonium acetate complex wood preservative and 5% m/m of Archer Daniels Midland GP-1125 linseed oil. The treated fiber was dried to between 1–2% MC, oven-dry basis. The resulting dried treated fiber was blended with various levels of liquid phenolic resin and 0.5% solids of a wax emulsion. Phenolic resin was applied to the treated fiber at 2, 4, 6 and 8% solids levels.

A control group of untreated fiber blended with 8% solids resin and 0.5% solids wax emulsion was manufactured to serve as a reference control. This level of phenolic resin and wax emulsion is typical for the industry.

Wood composite mats were formed in a deckle box measuring 21×21 inches (53×53 cm). Formed mats were pre-pressed to remove excess air and consolidate the mat to minimize squeeze out of fiber when pressing. This is a common practice in the industry. The mats were pressed at 380° F. (193° C.) for a total of 5.5 minutes–five minutes under pressure and a 30 second de-gas. The initial pressure was 550 psi (383 N/cm$^2$) on the mat, decreasing to a cook pressure of 200 psi (139 N/cm$^2$), and a reduction to 0 psi (0 N/cm$^2$) during the de-gas phase. The target thickness was ⅜ inch (1 cm) with a target density of 62 pcf (1 g/cm$^3$).

The pressed panels were allowed to hot stack 24 hours prior to mechanical and physical panel property testing. The panels were evaluated for internal bond, water absorption, thickness swell, strength, and stiffness.

With OSB, having observed the influence on mechanical properties of the oil/copper ammonium acetate complex mixture, it was determined to gradually decrease the level of phenolic resin used. This was done to gauge the impact of the resin level upon the mechanical and physical properties of OSB. Knowing the industry norm is as listed above, one would expect the properties of the resulting panels to fall off as the resin level was decreased. However, that was not the case.

Given the fact that it is standard practice within the MDF manufacturing industry to use PF resin loadings of 8%, the results provided as Table 3 are remarkable. It is apparent that that the oil/copper ammonium acetate complex combination can replace most, if not all, the phenolic resin in the finished panels. Panels containing a copper ammonium acetate complex and oil but no conventional resin possessed similar or superior properties over the controls. The presence of an oil and a copper ammonium acetate complex appears to produce panels with superior properties at any given resin level. The dimensional stability and water absorption characteristics of the MDF panels were significantly improved when the oil/copper ammonium acetate complex treatment was utilized regardless of resin level.

TABLE 3

MDF

| Group/Resin Solids Level (%) | Internal Bond (psi) | Strength (psi) | Stiffness (psi) | Water Absorption (%) | Thickness Swell (%) | Internal Bond (kPa) | Strength (MPa) | Stiffness (MPa) | Water Absorption (%) | Thickness Swell (%) |
|---|---|---|---|---|---|---|---|---|---|---|
| Control, 8% resin | 64.0 | 4325 | 460,779 | 61.9 | 39.9 | 441.2 | 29.82 | 3176.9 | 61.9 | 39.9 |

TABLE 3-continued

MDF

| Group/Resin Solids Level (%) | Internal Bond (psi) | Strength (psi) | Stiffness (psi) | Water Absorption (%) | Thickness Swell (%) | Internal Bond (kPa) | Strength (MPa) | Stiffness (MPa) | Water Absorption (%) | Thickness Swell (%) |
|---|---|---|---|---|---|---|---|---|---|---|
| Treated, 2% resin | 78.2 | 3539 | 480,556 | 23.2 | 15.5 | 539.2 | 24.40 | 3313.3 | 23.2 | 15.5 |
| Treated, 4% resin | 94.4 | 4543 | 565,638 | 25.4 | 14.1 | 650.9 | 31.32 | 3899.9 | 25.4 | 14.1 |
| Treated, 6% resin | 87.7 | 4796 | 567,570 | 23.5 | 11.3 | 661.9 | 33.07 | 3913.3 | 23.5 | 11.3 |
| Treated, 8% resin | 96.0 | 4679 | 556,543 | 27.3 | 10.5 | 66.9 | 32.26 | 3837.2 | 27.3 | 10.5 |

EXAMPLE 3

OSB—Oil Addition in the Blender

While excellent results were observed adding linseed oil and copper ammonium acetate complex wood treatment to the green furnish prior to drying, it was hypothesized that similar results could occur if the oil was added to the blender at the same time as the resin and wax. The copper ammonium acetate complex wood treatment is desirably added to the green strands prior to drying since the increase in moisture content associated with the water borne preservative might not be conducive to a blender application.

In the manufacture of OSB, wax emulsions are typically incorporated into the furnish at an addition rate of 1.0% solids. With such a low rate of addition, optimizing coverage and distribution on the entire volume of furnish can be a challenge. One of the potential benefits of adding the linseed oil at the same time as either the wax or liquid resin is that the combined volumes of these components would be increased. This would result in better coverage and distribution of the materials. As a consequence there is the potential to improve the panel properties by improving distribution alone. To evaluate the likelihood of this occurring, Archer Daniel Midland GP-1125 linseed oil was added to a commercial wax emulsion, Borden's EW 58-S.

The wax and linseed oil were mixed in a ratio of 50:50 based on solids of each material. This mixture was thoroughly mixed prior to application through a coil spinning disc atomizer to the strands being tumbled in a laboratory batch blender.

The strands used for the study were primarily aspen with a percentage of white birch and red pine mixed in. The strands were hydrated to approximately 50% moisture content, then treated with 3.1% m/m of an active copper ammonium acetate complex wood treatment, and dried to approximately 4% moisture content.

The treated strands were blended with 2.5% of powdered phenolic resin and various loadings of the blended oil and wax. A total of four groups of panels were produced for this study. A control group with the treated strands and a loading of 1.0% solids wax emulsion was manufactured for a reference. The three experimental combinations were 1.0% solids of the wax/oil mixture, 2.0% solids wax oil mixture, and 4.0% solids of the wax oil mixture.

The blended furnish was formed into 21-inch by 21-inch (53 cm×53 cm) mats. The target thickness was 12 inch (1.2 cm) with a target density of 42 pcf (0.67 g/cm$^3$). The panels were pressed at 400° F. (204° C.) with a total press time of 5.5 minutes. The panels were allowed to hot stack overnight prior to cutting into test specimens.

Since the wax and oil levels were elevated and the oil was not partially cured as in the previous examples, the internal bond testing was paramount to assess what if any effect the conditions used would have on bonding. Wet bending assessments were carried out to gauge the impact the perceived increase in water resistance would have on maintaining strength after exposure. Water absorption and thickness swell were measured to determine potential improvements.

The internal bond results testing indicates that we did not see as large an increase in strength as we observed in previous work where the oil was added to the green flakes. However, the oil loading was only 2.0% versus the 5.0% in the examples 1 and 2. Regardless, there was a dose response in internal bond strength: as the oil content increased from 0.5% to the maximum of 2.0% the internal bond value improved and was approximately double than that of the controls.

Similar results in improved wet bending properties were observed. The 2.0% and 4.0% overall dosage had significantly higher wet bending strength than the controls or 1.0% group.

As the percentage of oil and wax increased, the thickness swell and water absorption values decreased. At the 4.0% combination the thickness swell was reduced to 5.2% based upon the original thickness of the panel.

TABLE 4

OSB—Oil added to the dry flakes in the blender.

| Combination/Oil-Wax Loading | Internal Bond (psi) | Wet Strength (psi) | Water Absorption (%) | Thickness Swell (%) |
|---|---|---|---|---|
| Controls, 1.0% wax emulsion | 25.3 | 2041 | 24.4 | 6.8 |
| 1.0% Wax/Oil | 25.1 | 2083 | 23.4 | 6.8 |
| 2.0% Wax/Oil | 34.8 | 2367 | 20.8 | 6.1 |
| 4.0% Wax/Oil | 45.2 | 2331 | 19.6 | 5.2 |
| Combination/Oil-Wax Loading | Internal Bond (kPa) | Wet Strength (MPa) | Water Absorption (%) | Thickness Swell (%) |
| Controls, 1.0% wax emulsion | 174.4 | 14.1 | 24.4 | 6.8 |
| 1.0% Wax/Oil | 173.1 | 14.4 | 23.4 | 6.8 |
| 2.0% Wax/Oil | 239.9 | 16.3 | 20.8 | 6.1 |
| 4.0% Wax/Oil | 311.6 | 16.1 | 19.6 | 5.2 |

EXAMPLE 4

OSB Panel Manufacture Without Conventional Resin Systems

The previous examples demonstrate that there is a strong synergy between reactive agricultural based oils and copper ammonium acetate complex wood treatment. When both components are used together to treat green or dry furnish there tends to be an improvement in strength of the bonds formed between individual particles making up the wood based composite. It is hypothesized earlier that there appears to be a chemical reaction between the oil and copper ammonium acetate complex wood treatment that effectively epoxidizes the linseed oil into a strong bonding agent. While the increase in dimensional stability produced by the use of oil and copper ammonium acetate complex wood treatment in combination is attractive for composite panel products, the observed improvement in resin bond suggests that there may be additional benefits for a composite panel manufacturing processes. One is the manufacture of superior panel products, and the other is the development of a whole new resin system that could replace a percentage or all of the synthetic resins currently being used by the composite board industry.

Typically, when oriented strandboard mats are pressed under heat and pressure in the absence of resin, the resulting panel has no strength or integrity. The flakes can be separated freely. The flakes would appear to be the same after pressing as before blending.

The objective of this study was to investigate the bonding efficacy of the linseed oil/copper ammonium acetate complex wood treatment reaction. Essentially, we were trying to determine if it is possible to manufacture composite panels using little or no synthetic resin, but relying solely on the bond produced by the interaction of the oil and preservative.

For this study, aspen strands containing a small percentage of white birch and red pine were rehydrated from dry to approximately 50% moisture content. The wet strands were blended with a mixed solution of copper ammonium acetate complex wood treatment and Archer Daniels Midland's GP-1125 linseed oil. The final addition rate of copper ammonium acetate complex wood treatment in the panel was 3.1% m/m active and the addition rate of linseed oil was 5.0% m/m active. The strands were dried to approximately 4% moisture content after treatment.

One set of the strands was blended with a liquid phenolic resin at a 0.5% solids addition rate. For the other set the resin blending step was skipped. Mats (21-inch by 21-inch inch, 53 cm×53 cm) were formed with the two sets of oil/copper ammonium acetate complex wood treatment treated strands. Mats were pressed in a laboratory press to a target panel thickness of ½ inch (1.2 cm) with a target density of 42 pcf (0.67 g/cm$^3$). Panels were pressed at 400° F. (204° C.) for a total of 7.5 minutes. Internal bond measurements were made on samples of the panels without synthetic resin immediately after pressing. Additional internal bond measurements and dry static bending assessments were made on test specimens after hot stacking overnight.

Coming out of the press the panels made without synthetic resin appeared to be similar in appearance and behavior to conventional panels bonded with conventional resin systems. The no-resin panels appeared to be strong and stiff to the touch, and when the panels were struck a hard solid sound was returned.

The internal bond measurements of the panels made with no resin (Table 5) show that a suitable oriented strandboard panel can be produced. The internal bond values on panels without resin, straight out of the press (i.e. hot), averaged 34.2 psi (23.8 N/cm$^2$). These values were similar in magnitude to the internal bond values of some of the control panels produced in the earlier examples. After hot stacking overnight, the internal bond value in these same panels increased to an average of 38.6 psi (26.9 N/cm$^2$). The IB values for test panels containing 0.5% resin solids exhibited an average internal bond of 49.4 psi (34.43 N/cm$^2$).

The strength and stiffness of the no-resin panel was slightly better than the panel containing 0.5% resin solids. Based on the MOR and MOE data, both sets of panels (resin and no resin) meet acceptance criteria for randomly produced oriented strandboard.

TABLE 5

| OSB panels made without synthetic resin | | | |
| --- | --- | --- | --- |
| Resin level | Internal Bond, psi | Strength, psi | Stiffness, psi |
| 0.5% | 49.4 | 1704 | 426,700 |
| None | 34.2 hot 38.6 cold | 2201 | 487,830 |
| Resin level | Internal Bond (kPa) | Strength (MPa) | Stiffness (MPa) |
| 0.5% | 340.6 | 11.7 | 2941.9 |
| None | 235.8 hot 266.1 cold | 15.2 | 331.3 |

The data clearly indicates that there is a strong reaction between the linseed oil and copper ammonium acetate complex wood treatment that can be exploited to produce acceptable strandboard panels without the use of synthetic resins. In the previous examples the benefits of a combination of linseed oil and preservative in the manufacture of oriented strand board were demonstrated. The intent of this study was to investigate the synergy of other agricultural oils and Comptec preservative on OSB panel properties. Results for canola, rapeseed, soy and tung oils are presented relative to linseed oil.

Seven panel sets were produced. Treatment of flakes was achieved using a Coil type atomizer and a rotary blender. Green flakes (45% mc) were treated with Comptec preservative to achieve a 1% a.i. loading (oven dry weight of flakes basis) and a 5% solids basis with different oils (canola (Archer Daniel Midland 81-060-0), rapeseed, soy (ADM Golden Chef 104-051), linseed (ADM GP-1125) and tung) allowing sufficient dwell time for diffusion. Treated flakes were then dried to a nominal 2% moisture content. Flakes without treatments and flakes treated with 1% m/m a.i. Comptec alone were prepared as reference controls.

Face and core liquid formaldehyde resin was added to each batch of the dry treated furnish at an addition rate of 3.5% along with a petroleum based wax emulsion Borden EW58S (1% solids oven dry weight of wood flakes basis). Panels were hand formed in a random orientation on mats (21-inch by 21-inch inch, 53 cm×53 cm). Mats were pressed in a laboratory press to a target panel thickness of 12 inch (1.2 cm) with a target density of 42 pcf (0.67 g/Cm$^3$). Panels were pressed at 380° F. (204° C.) for a total of 6 minutes.

Manufactured panels were tested for internal bond, water absorption, thickness swell and wet Modulus of Rupture. Summarized results are tabulated in Table 6.

TABLE 6

| A) Internal Bond | | | | |
| --- | --- | --- | --- | --- |
| Treatment | Density (pcf) | Density (g/cm3) | IB (psi) | IB (kPa) |
| Comptec only | 45.1 (2.7) | 0.72 (0.04) | 63.5 (10.3) | 437.8 (71) |
| Canola oil | 44.9 (2.2) | 0.72 (0.04) | 49.3 (14.8) | 339.9 (102) |

TABLE 6-continued

| Linseed | 45.6 (2.5) | 0.73 (0.04) | 93.2 (20.0) | 642.6 (137) |
|---|---|---|---|---|
| Rape seed | 45.2 (3.2) | 0.72 (0.05) | 51.6 (8.8) | 355.7 (61) |
| Soy | 44.5 (2.2) | 0.71 (0.04) | 56.6 (16.0) | 390.2 (110) |
| Tung | 45.4 (2.8) | 0.73 (0.04) | 120.2 (22.3) | 828.7 (154) |
| Untreated control | 45.3 (2.2) | 0.73 (0.04) | 42.2 (11.0) | 290.9 (76) |

B) Wet Bending

| Treatment | Density (pcf) | Density (g/cm3) | MOR (psi) | MOR (MPa) |
|---|---|---|---|---|
| Comptec only | 46.8 (2.2) | 0.75 (0.04) | 2949 (521) | 20.3 (3.6) |
| Canola oil | 47.1 (2.3) | 0.75 (0.04) | 2332 (362) | 16.1 (2.5) |
| Linseed | 46.5 (2.6) | 0.75 (0.04) | 2839 (540) | 19.6 (3.7) |
| Rape seed | 45.8 (3.7) | 0.73 (0.06) | 2486 (473) | 17.1 (3.3) |
| Soy | 44.5 (2.2) | 0.71 (0.04) | 2332 (604) | 16.1 (4.2) |
| Tung | 46.7 (2.8) | 0.75 (0.04) | 3194 (639) | 22.0 (4.4) |
| Untreated control | 46.9 (2.0) | 0.75 (0.03) | 2437 (536) | 16.8 (3.7) |

C: Water Absorption/Thickness Swell

| Treatment | Density (pcf) | Density (g/cm3) | Absorption % | Thickness Swell (%) |
|---|---|---|---|---|
| Comptec only | 45.4 (1.9) | 0.727 (0.03) | 30.4 (1.8) | 11.0 (0.9) |
| Canola oil | 45.4 (2.6) | 0.727 (0.04) | 25.8 (5.1) | 8.2 (2.3) |
| Linseed | 44.7 (2.1) | 0.716 (0.03) | 25.0 (6.7) | 6.6 (3.3) |
| Rape seed | 45.8 (1.8) | 0.734 (0.03) | 13.0 (2.3) | 4.1 (1.3) |
| Soy | 44.3 (2.5) | 0.710 (0.04) | 27.8 (2.4) | 9.5 (2.1) |
| Tung | 46.8 (1.6) | 0.750 (0.03) | 24.7 (2.6) | 6.8 (1.5) |
| Untreated control | 45.2 (3.0) | 0.724 (0.05) | 34.7 (5.1) | 14.4 (3.0) |

Figures in brackets represent Standard deviations

As the results in Table 6 illustrate the internal bond (IB) values for all treated panels are superior to the IB values untreated control panels. The Comptec only treatment yielded an IB of 63.5 psi while the addition of tung and linseed oils to the Comptec enhanced the IB values considerably 120 and 93.2 psi respectively.

All treatments provided superior water absorption and thickness swell values relative to the untreated controls. Rapeseed oil in combination with Comptec proved to be the most efficacious of the series with absorption values of 13% and swelling of 4.1% respectively.

The wet MOR values of the all treated panels were equivalent to the MOR values of the untreated controls indicating that the strength characteristics of the treated boards were not affected by the different treatments.

In conclusion it is apparent that a combination of Comptec with a range of different agricultural based oils can enhance the performance characteristics of oriented strand board.

What is claimed is:

1. A treated wood composite comprising:
   a. a predominant proportion of wood particles;
   b. a copper based wood preservative, present in said wood in an amount effective to improve the resistance of the treated wood to decay; and
   c. a drying oil, present in said wood in an amount effective to reduce the thickness swell of the treated wood.

2. The treated wood of claim 1, in the form of treated wood particles joined to form a composite wood product.

3. Treated wood comprising:
   a. a predominant proportion of wood particles;
   b. a copper based wood preservative, present in said wood in an amount effective to improve the resistance of the treated wood to decay; and
   c. a drying oil, present in said wood in an amount effective to improve the bond strength of the treated wood.

4. The treated wood of claim 3, further comprising an amount of a resin bonding agent to improved the bond strength of the resulting product.

5. The treated wood of claim 3, in the form of treated wood particles joined to form a composite wood product.

6. A method of making treated wood particles comprising:
   a. providing green wood particles;
   b. adding to said green wood particles a copper based wood preservative, present in said wood in an amount effective to improve the resistance of the treated wood to decay; and
   c. adding to said green wood particles a drying oil, present in said green wood particles in an amount effective to reduce the water absorption of the treated wood particles.

7. The method of claim 6, further comprising the step of pressing the drying oil treated wood particles to form a composite wood product.

8. The method of claim 7, further comprising the step, preceding said pressing step, of adding a binding resin to said wood particles.

9. The method of claim 6, wherein said copper based wood preservative comprises from about 0.5 wt. % to about 15 wt. % of a copper ammonium acetate complex, on a dry wood basis.

10. The method of claim 6, wherein said dying oil is added in an amount ranges from about 0.5 wt. % to about 50 wt. %, on a dry wood basis.

11. Treated wood comprising:
   a. a predominant proportion of wood plies;
   b. a copper based wood preservative, present in said wood plies in an amount effective to improve the resistance of the treated wood to decay; and
   c. a drying oil, present in said wood plies in an amount effective to improve the bond strength of the treated wood.

12. The treated wood of claim 11, further comprising an amount of a resin bonding agent effective to bond the resulting product.

13. The treated wood of claim 11, in the form of treated wood plies joined to form plywood.

14. Treated wood comprising:
   a. a predominant proportion of wood particles;
   b. a copper based wood preservative, present in said wood particles in an amount effective to improve the resistance of the treated wood to decay; and
   c. a drying oil, present in said wood particles in an amount effective to reduce the water absorption of the treated wood.

15. The treated wood of claim 14, wherein said copper based wood preservative comprises from about 0.5 wt. % to about 15 wt. % of a copper ammonium acetate complex, on a dry wood basis.

16. The treated wood of claim 14, comprising from about 0.5 wt. % to about 50 wt. % of said drying oil, on a dry wood basis.

17. The treated wood of claim 14, in the form of treated wood particles joined to form a composite wood product.

18. Treated wood comprising:
   a. a predominant proportion of wood plies;
   b. a copper based wood preservative, present in said wood plies in an amount effective to improve the resistance of the treated wood to decay; and
   c. a drying oil, present in said wood plies in an amount effective to reduce the water absorption of the treated wood.

19. The treated wood of claim 18, in the form of treated wood plies joined to form plywood.

* * * * *